Feb. 23, 1943.  A. U. WELCH, JR  2,312,140
GAP FILLER
Filed May 8, 1940
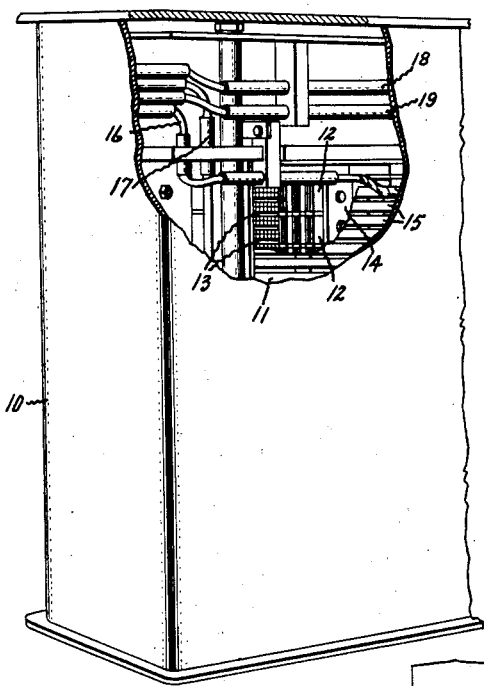
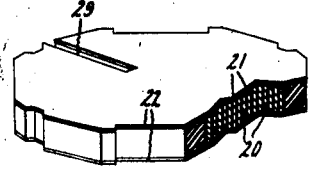
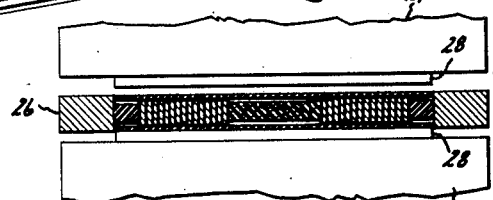
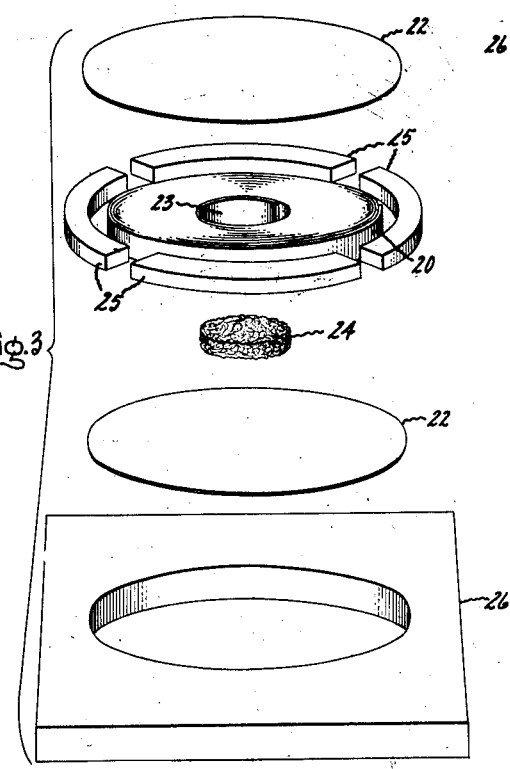
Inventor:
Alanson U. Welch Jr.,
by Harry E. Dunham
His Attorney.

Patented Feb. 23, 1943

2,312,140

UNITED STATES PATENT OFFICE 2,312,140

GAP FILLER

Alanson U. Welch, Jr., Pittsfield, Mass., assignor to General Electric Company, a corporation of New York Application May 8, 1940, Serial No. 334,027

10 Claims. (Cl. 175—356)

My invention relates to a gap filler and is particularly applicable to a filler for the gaps in the core of a reactor.

In the manufacture of reactors for high voltage alternating lines it is customary to provide the magnetic structure or core with a suitable number of gaps so as to increase the total kilovolt-amperes of the reactor. The gaps have been filled with a core gap filler of solid insulating material. When the reactor is connected to an alternating current line, pulsating magnetic forces appear between adjacent magnetic structures across each of the gaps. When a material which has a relatively low stiffness is employed as a gap filler, such as a solid insulating material, the pulsating forces appearing across the gap cause vibration and noise.

It is therefore an object of my invention to provide a filler suitable for gaps between magnetic structures which will maintain the gap at a substantially constant width.

Another object of my invention is to provide a gap filler which has a relatively high modulus of elasticity.

A further object of my invention is to provide a reactor with an improved gap filler so that pulsating magnetic forces will cause a minimum of noise and vibration in the reactor.

I accomplish these and other objects by providing a gap filler of material which has a relatively high modulus of elasticity, a relatively low permeability, and a relatively high resistivity. A material which has such characteristics is a non-magnetic metal, such as bronze or certain alloy steels. The filler is therefore made into a suitable shape by employing a plurality of metallic members having the above-mentioned electrical and mechanical characteristics. Each of the separate metallic members is surrounded with a suitable insulating material so as to prevent any closed paths in which currents may circulate. The insulating metallic members are then formed into a unitary structure which may be placed in a gap between adjacent magnetic structures in the core member of any suitable magnetic device, such as a reactor.

Further objects and advantages of my invention will become apparent from the following description referring to the accompanying drawing and the features of novelty which characterize my invention will be pointed out with particularity in the claims annexed to and forming a part of this specification.

In the drawing, Fig. 1 is a perspective view in partial section of one end of a reactor which is provided with an embodiment of my invention; Fig. 2 is a perspective view partly broken away of the core gap filler which is employed in the gaps of the core of the reactor illustrated in Fig. 1; Fig. 3 is an exploded perspective view of the parts of the filler illustrated in Fig. 1 in their non-assembled condition and a plate in which they may be placed during assembly; Fig. 4 is a sectional side elevation of the parts of the filler in their assembled positions, the filler being placed in the bore of the plate illustrated in Fig. 3 which is between the platens of a hydraulic press; Fig. 5 is a perspective view partly broken away illustrating a modification of the gap filler shown in Fig. 2, and Fig. 6 is a perspective view partly broken away of a further modification of the gap filler illustrated in Fig. 2.

Referring to the drawing, in Fig. 1 I have illustrated my improved gap filler as applied to a reactor. However, it is to be understood that my improved gap filler may be employed with any other magnetic device in which it is desired to place a filler of low permeability and high stiffness in the gaps between adjacent magnetic structures. The reactor illustrated in Fig. 1 includes a casing 10 which surrounds a plurality of core members 11. I have illustrated a portion of only one of such core members, but it is to be understood that any suitable number of core members may be employed, the reactor illustrated in Fig. 1 being designed for three such core members 11. The core member includes a plurality of magnetic structures 12 which are separated from each other to form gaps 13. The gaps 13 are each provided with my improved core gap filler which is illustrated in Fig. 2 and will be more completely hereinafter described. The magnetic structures 12 are relatively tightly clamped together by a plurality of non-magnetic steel clamping plates, one of which being indicated by the numeral 14. A plurality of coil members 15 are provided which surround each of the magnetic structures 12. A lead in wire 16 is connected to the top coil member 15 and each of the remaining coil members on the core 11 are connected in series with each other. A return lead 17 is provided, this lead being connected to the coil member at the bottom of the core 11. Leads 18 and 19 are provided for making electrical connection with the remaining two coil members which surround the two other cores which are similar to the core 11.

When a reactor such as illustrated in Fig. 1 is employed on a high voltage alternating current line, pulsating forces will develop between adjacent magnetic structures, across each of the gaps. Such forces will, therefore, tend to change the gap width and thereby cause vibration and noise. In order to overcome these difficulties, I provide a core gap filler which has a relatively high stiffness. One of the restrictions in the use of a core gap filler is that the material used must not provide conducting paths which short circuit the magnetic flux across the gap between adjacent magnetic sections of the core. If it were not for this restriction solid metallic plates could be used which have a very high modulus of elasticity. However, metallic plates, although having such a high modulus of elasticity, would short circuit the gaps and thereby make the reactors less efficient. I therefore provide a core gap filler which uses a plurality of metallic members, each of these metallic members being insulated from each other and from adjacent magnetic structures with suitable insulating material. With such a structure I have found that a core gap filler is obtained which has a relatively high modulus of elasticity so as to minimize noise and vibration in the resultant reactor, and which also has the desirable electrical characteristics, that is, low permeability and high resistivity.

As shown in Fig. 2, the filler includes a plurality of metallic bar members 20 which are surrounded by suitable insulating material 21. Each of the bars is made up of a material which has a relatively high resistivity so as to minimize eddy currents, and a relatively low permeability or which is relatively non-magnetic so that the smallest possible gap may be employed in the reactor. A suitable non-magnetic material includes bronze, manganese steel, nickel steel, and chromium steel. Also, these materials have a modulus of elasticity of the order of about 10 to 30 million. Each of the metallic bars has a relatively narrow width so as to minimize eddy currents. The insulating material 21 which surrounds each of the bar members may be made of any suitable material, such as fiber glass, enamel, paper, asbestos, or any synthetic insulating material. In order to be sure that the adjacent magnetic structures will not cut through the relatively thin insulation 21 when the filler is tightly clamped between adjacent magnetic structures, additional insulating plates 22 may be placed on the top and bottom of the gap filler. The core gap filler of the above-mentioned insulated metallic members is formed to a sufficient size by spirally winding a relatively thin insulated bar member of desirable width. This spirally wound insulated bar member is illustrated in perspective in Fig. 3. The bar may be wound around a steel frame which when removed leaves a hole 23 in the center of the spirally wound member.

In order to form a completely unitary structure the spirally wound insulated bar is fitted with an insulating material 24 in the hole 23 and surrounded with a plurality of insulating fillers 25. The insulating plates 22 are also placed on the top and bottom thereof. The parts thus assembled are placed in the bore of a plate 26 and the parts in the bore of the plate are impregnated with a suitable liquid insulating filler such as a phenolic varnish and placed between the platens 27 of a steam heated hydraulic press as shown in Fig. 4. Each of the platens has a protruding portion 28 which will just fit inside the bore of the plate 26. When heat and pressure are then applied the protruding portions 28 will tightly squeeze the assembled portions of the core gap filler so that when the pressure and heat operation is over a unitary structure obtains which may then be removed from the hole in the plate 26.

In order to prevent closed paths through which currents may circulate in the spirally wound metallic member a radial slit 29 is cut from the outside periphery to the inside periphery and through the metallic member from one insulating plate 22 to the other. Thus each turn of the spirally wound metallic member is an open circuited turn so that no currents may circulate therethrough.

When a suitable number of core gap fillers have been made according to the method described above, a core gap filler is placed between each of two adjacent magnetic structures which go to make up the core member 11. The magnetic structures and fillers are then tightly squeezed together so that compressive forces are set up in each of the fillers. Since the fillers are made of a relatively dense material the pulsating forces which are set up, when the reactor is placed on an alternating current line, therefore, will cause only a minimum of vibration and noise. In order to see whether any of the insulation has broken through during the assembly of the fillers between the structures of the core member a probe may be placed in each of the slits 29. In this way the insulation between each separate bar member and between all the bars and the adjacent magnetic structures may be inspected.

Instead of employing a spirally wound insulated non-magnetic metallic bar member, a core gap filler may be employed which includes an insulating moldable material 29 through which a plurality of metallic members 30 are dispersed. The moldable or plastic material will therefore form a suitable binding material for the small metallic particles 30 so that the resultant filler will form a solid mass of metallic members, each of which being insulated from the other. Small metallic balls or shot of non-magnetic material such as has already been mentioned, are employed for the metallic members 30 and any suitable plastic may be employed for the binder, such as Bakelite.

Furthermore, instead of forming the filler of a spirally wound bar member as is done in Fig. 2, the filler may have a plurality of parallel arranged bar members 31 of non-magnetic material, each of which being insulated from the adjacent by suitable insulation 32. No slit 29 will be needed, of course, in this modification, since each of the bars will be electrically insulated from the others. Insulating plates 33 may also be placed on either side of the filler.

In view of the foregoing, it will be seen that I have provided a filler which may be placed in gaps between adjacent magnetic structures, such as are found in a reactor, which will have a relatively high modulus of elasticity. In order to have the desired electrical characteristics the filler is made of a plurality of non-magnetic metallic bar members so that the finished filler will have a relatively low permeability, so that the smallest possible gap may be used, and a relatively high resistivity so as to keep eddy currents to a minimum. When such a gap filler is employed with a reactor which is to be connected to an alternating current line, objectionable vibrations and noise will be thereby kept to a minimum.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. A reactor including a core member having a plurality of magnetic structures, said structures being so disposed as to define gaps between said adjacent structures, coil members disposed in magnetic relationship with said core member, means for connecting said coil member with an alternating source of power so that pulsating magnetic forces will appear across said gaps, a plurality of relatively non-magnetic members having a relatively high resistivity, and a relatively high modulus of elasticity of the order of approximately 10 to 30 million disposed within said gaps, insulating means surrounding said members so that said members and insulating means form a core gap filler which will allow a minimum of noise and vibration when the pulsating forces appear across said gaps, and means clamping said magnetic structures and the gap filling material relatively tightly together.

2. A reactor including a core member having a plurality of magnetic structures, said structures being disposed so as to define a gap between said structures, relatively non-magnetic members composed of material having a relatively high modulus of elasticity of the order of approximately 10 million disposed within said gap, insulating means surrounding said members so that said members and said insulating means form a gap filler for said core, and means clamping said magnetic structures and the gap filling material relatively tightly together.

3. A reactor including a core member having a plurality of magnetic structures, said structures being disposed so as to define a gap between said structures, a spirally wound insulated metallic bar disposed within said gap, said spirally wound bar being slit radially so that there will be no short circuited path therein so that said insulated metallic bar forms a gap filler for said core.

4. A reactor including a core member having a plurality of magnetic structures, said structures being disposed so as to define a gap between said structures, a spirally wound insulated metallic bar disposed within said gap, said bar comprising a metal having a relatively high resistivity, said spirally wound bar being slit radially so that there will be no short circuited path in said bar whereby said spirally wound insulated bar forms a gap filler for said core.

5. A reactor including a core member having a plurality of magnetic structures, said structures being disposed so as to define a gap between said structures, a spirally wound insulated metallic bar disposed within said gap, said bar comprising a metal having a relatively low permeability, said spirally wound bar being slit radially so there will be no short circuited path in said bar whereby said spirally wound insulated bar forms a gap filler for said core.

6. A reactor including a core member having a plurality of magnetic structures, said structures being disposed so as to define a gap between said structures, a spirally wound insulated member disposed within said gap, said member comprising a material having a relatively high resistivity, a relatively high modulus of elasticity, and a relatively low permeability, said spirally wound member being slit radially so that there will be no short circuited path in said member whereby said member forms a gap filler for said core.

7. A reactor including a core member having a plurality of magnetic structures, said structures being disposed so as to define a gap between said structures, metallic means disposed within said gap, said metallic means comprising a plurality of insulated bars of relatively non-magnetic material and having a modulus of elasticity of the order of approximately 10 to 30 million, each being disposed close to the adjacent bar, insulating means for binding said bars together to form a relatively dense gap filler for said core, and means clamping said magnetic structures and the gap filling material relatively tightly together.

8. A reactor including a core member having a plurality of magnetic structures, said structures being disposed so as to define a gap between said structures, an insulating plastic material, a plurality of non-magnetic metallic particles, said particles being disposed throughout said insulating plastic material so as to form a gap filler for said core having a relatively low permeability, a relatively high resistivity, and a relatively high modulus of elasticity.

9. A filler for a gap in a magnetic circuit including a spirally wound insulated bar, said spirally wound bar being slit radially so that there are no short circuited paths in said bar, said bar having a relatively high modulus of elasticity so that it will maintain the gap within which it is placed at a substantially constant width.

10. A filler for a gap in a magnetic circuit including a spirally wound insulated metallic bar, said spirally wound bar being slit radially so that there are no short circuited paths in said bar, said bar having a relatively high modulus of elasticity and a relatively high resistivity, and an insulating binder impregnating said spirally wound insulated bar so that a relatively dense unitary structure is formed.

ALANSON U. WELCH, Jr.